Oct. 13, 1931.  A. E. BROWN  1,826,985
METHOD OF AND MACHINE FOR MANUFACTURING EXPANSION JOINTS
Filed July 7, 1927  7 Sheets-Sheet 1
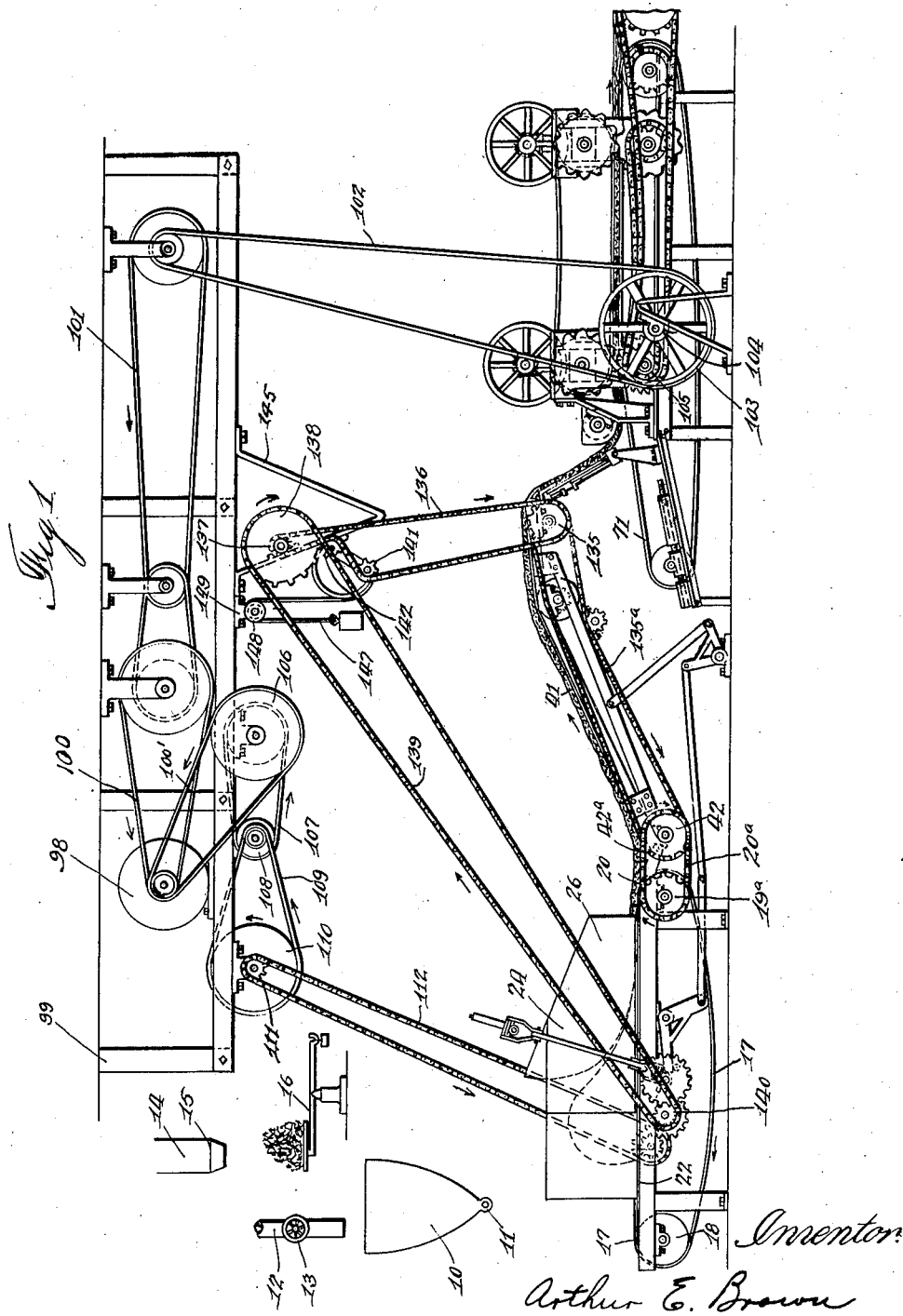

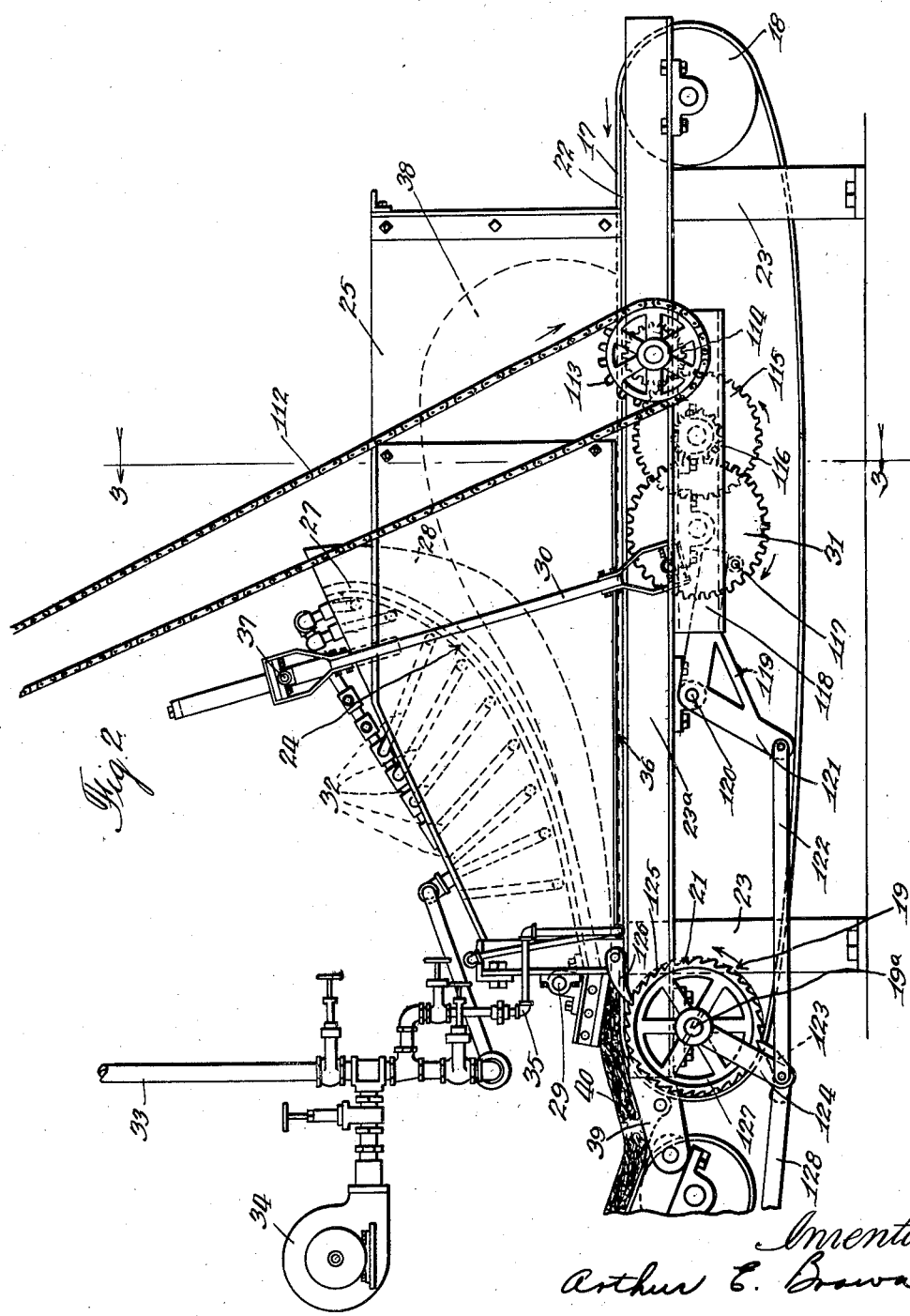

Oct. 13, 1931.   A. E. BROWN   1,826,985
METHOD OF AND MACHINE FOR MANUFACTURING EXPANSION JOINTS
Filed July 7, 1927   7 Sheets-Sheet 3
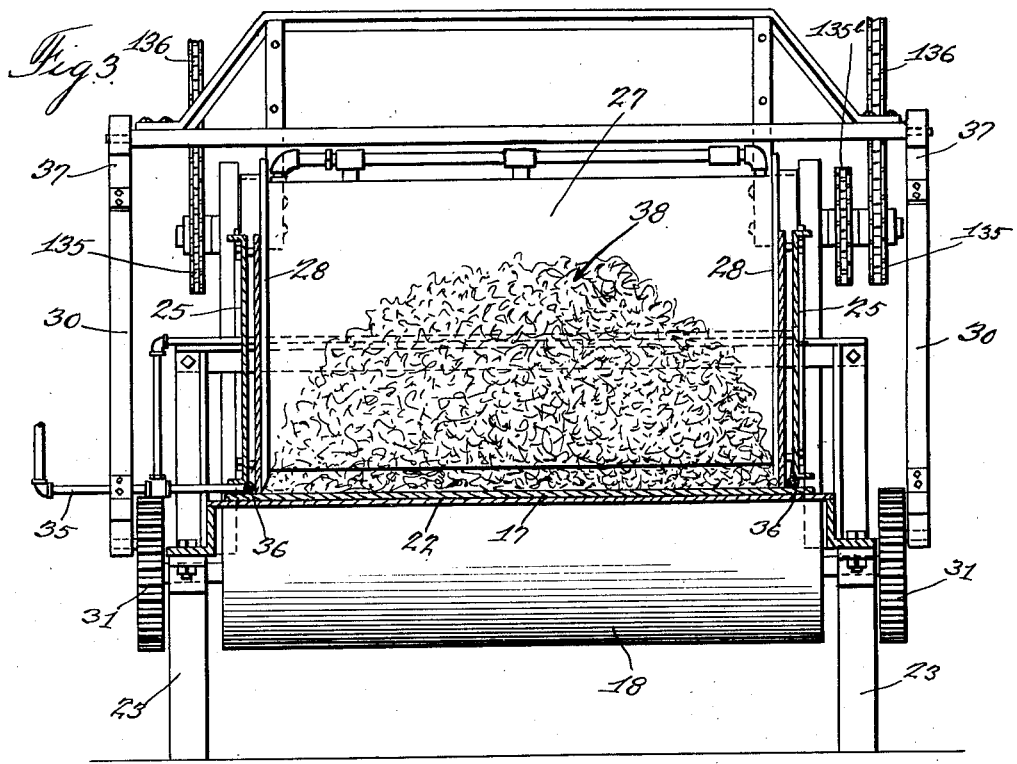
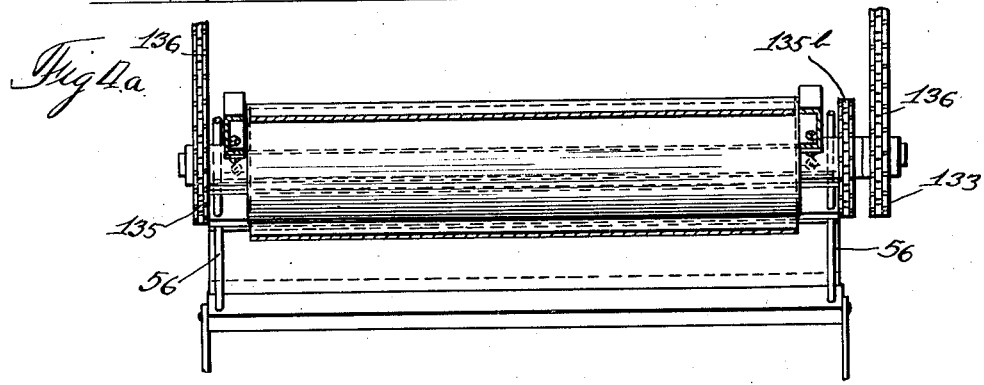

Oct. 13, 1931. A. E. BROWN 1,826,985
METHOD OF AND MACHINE FOR MANUFACTURING EXPANSION JOINTS
Filed July 7, 1927 7 Sheets-Sheet 4
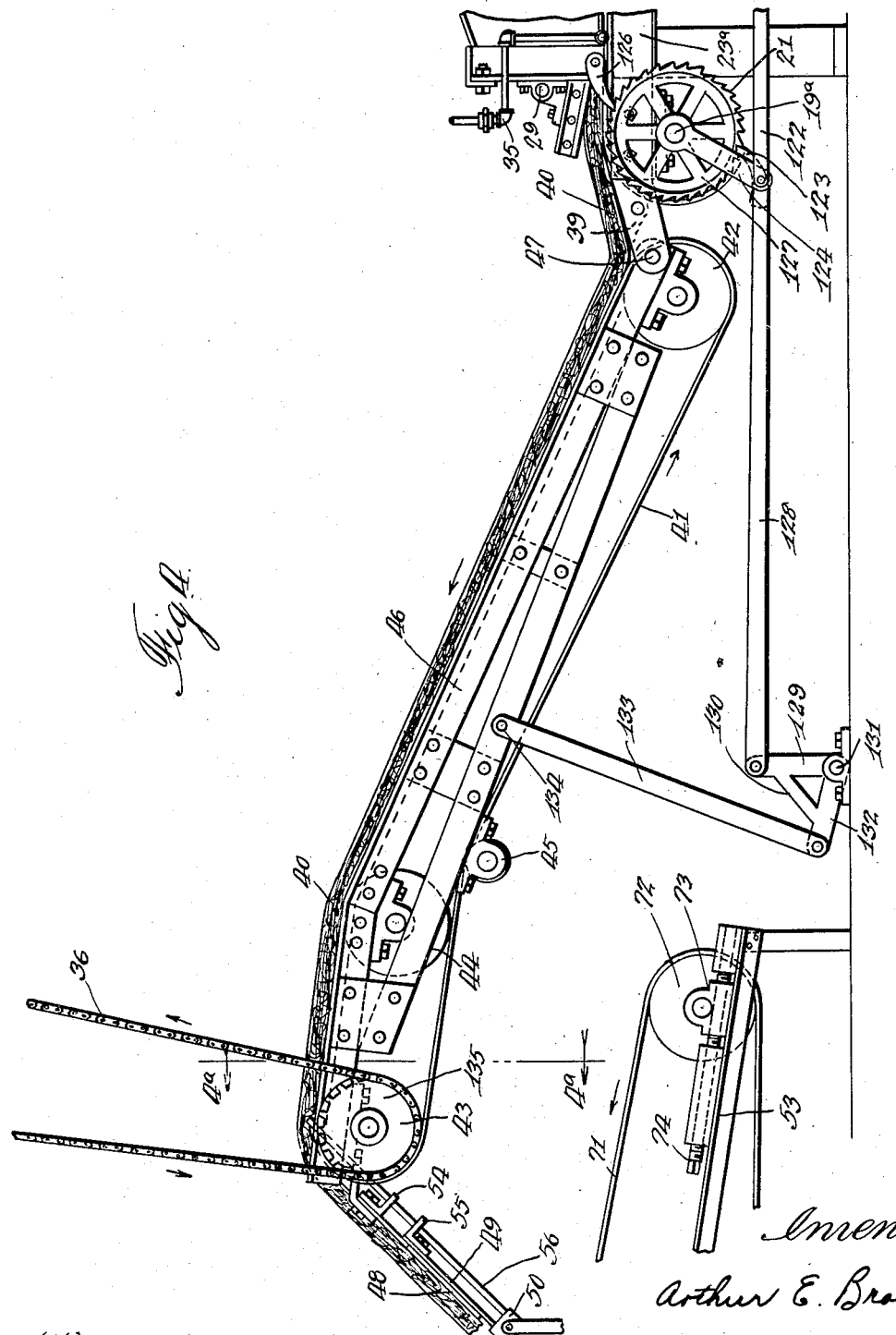

Oct. 13, 1931.  A. E. BROWN  1,826,985
METHOD OF AND MACHINE FOR MANUFACTURING EXPANSION JOINTS
Filed July 7, 1927   7 Sheets-Sheet 5
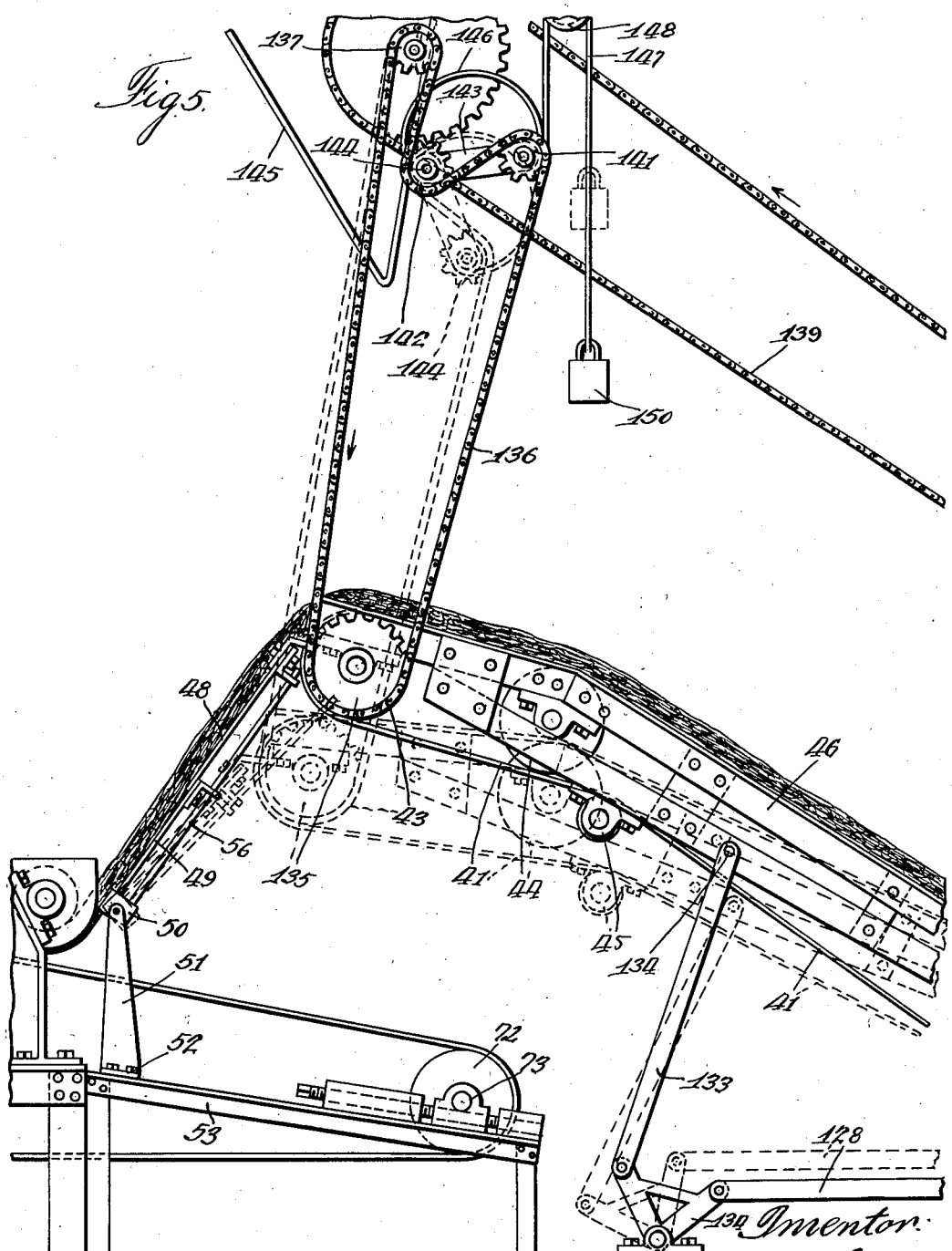

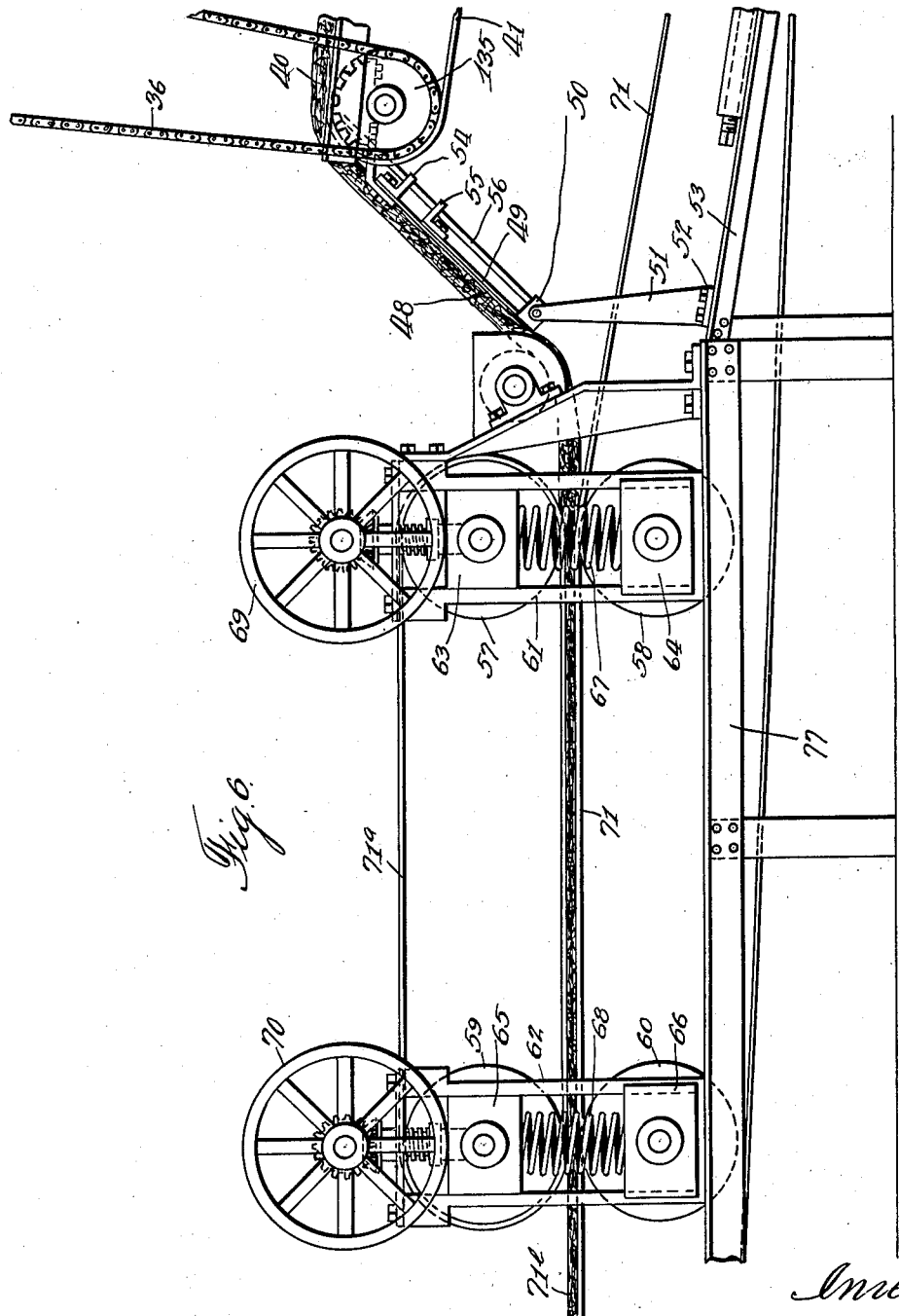

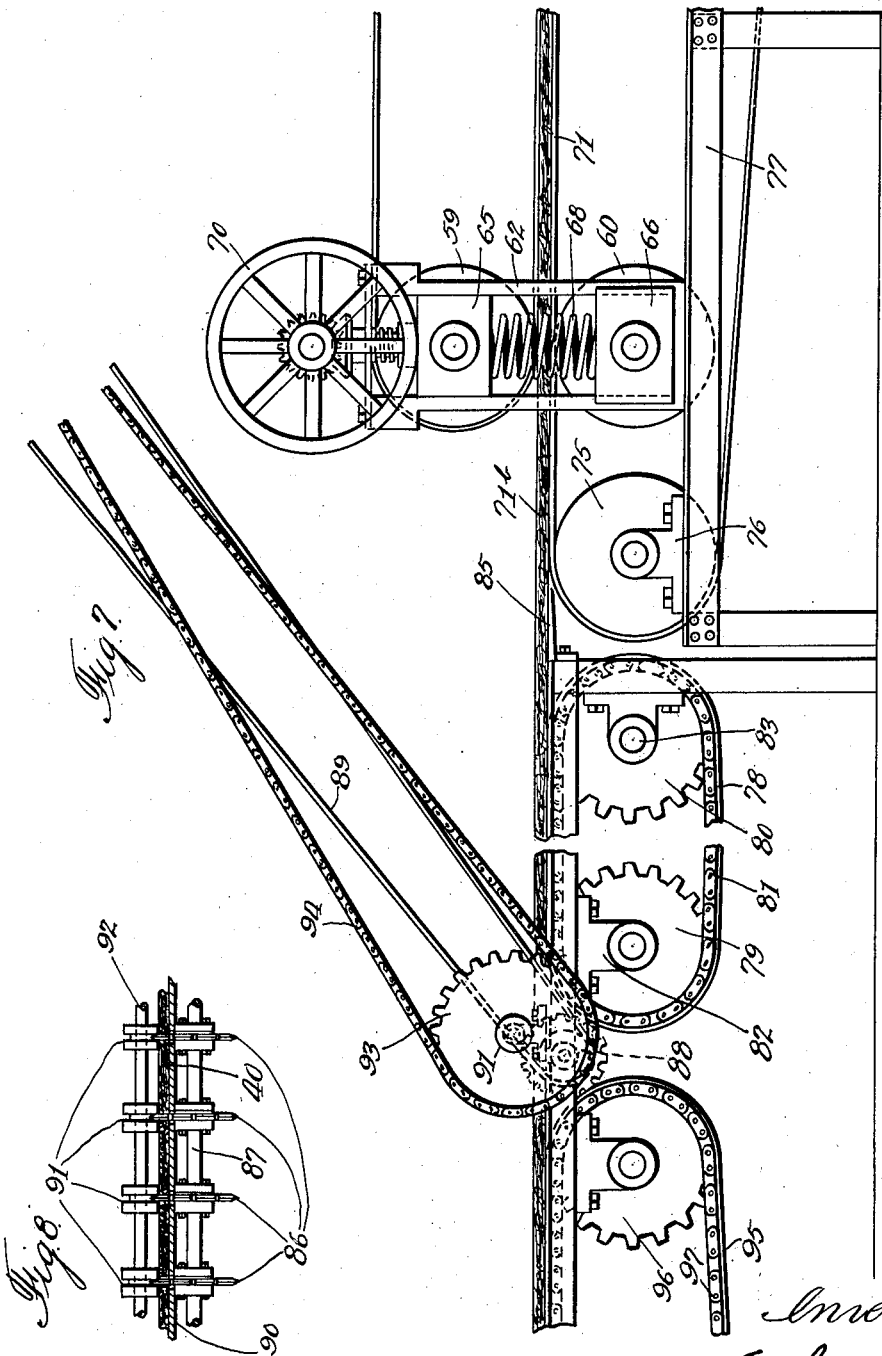

Patented Oct. 13, 1931

1,826,985

UNITED STATES PATENT OFFICE

ARTHUR E. BROWN, OF ELGIN, ILLINOIS, ASSIGNOR TO W. R. MEADOWS, INCORPORATED, OF ELGIN, ILLINOIS, A CORPORATION OF ILLINOIS

METHOD OF AND MACHINE FOR MANUFACTURING EXPANSION JOINTS

Application filed July 7, 1927. Serial No. 203,958.

My invention relates to a method of manufacturing expansion joints or similar products as well as to a machine for practicing the said method, and it has particular relation to a method and machine for working an adherent plastic mass into sheet form and thereafter cutting said sheets into strips.

I will hereinafter describe my invention in connection with the manufacture of what are known as expansion joints, that is, flat ribbon-like strips of material composed of asphalt and fibrous material. These strips are adapted to be placed between adjacent sections of concrete highways, or of other structures composed of concrete, and are thus placed in order to provide for the expansion and contraction of the concrete sections due to changes in temperature occasioned by weather conditions, hence the term "expansion joints."

I have found it exceedingly difficult to reduce the manufacture of such expansion joints to an economical basis. The sticky plastic nature of the mix from which such joints are made renders it extremely difficult to work a mass of the raw mixed material into sheet form. Of course this may be done by hand in forms, but such procedure is very expensive and with the present day cost of material and labor is almost prohibitive to put into practice. On the other hand, attempts have been made in the past to feed the plastic material between forming rolls to thereby form sheets of material which may be left to solidify and be thereafter cut into strips of requisite width. It is a well known fact however, that products of this character must be very carefully fed between each roll or holes and discrepancies in thickness of the sheet so produced will result which, of course, renders such a sheet unworkable for the production of strips. I have found that the required care slows up the production and the necessity of employing additional men has made this process exceedingly expensive, and therefore, impractical.

If on the other hand, no attempt is made to carefully feed the material between the rolls, that is, if it is attempted to form sheets by placing a large amount of material in front of the rolls and urging this between the said rolls, the mass will not form properly, since the plastic is of such a character that it does not readily "take" between the rolls.

My improved method contemplates the initial forming of a thick sheet-like mass of material which may be moved down between the forming rolls in an already compact and closely knit sheet form so that no holes will be present in the finished relatively thin sheet formed therefrom. Moreover, by so arranging the material prior to its introduction between the rolls, I am enabled to insure an adequate supply to prevent interruption in the sheet without, however, causing the mass in front of the rolls to be so bulky as to prevent the proper "take" between said rolls.

In pursuance of this method, I first knead or press the mass of plastic material initially to form it, as just outlined. This pressing, as I will hereafter more fully explain, must of necessity be intermittent in nature to obtain the proper production. It is further necessary, therefore, that the variation between the intermittent pressing and production of the initial sheet, and the resultant continuously flowing finished sheet of material, be so compensated for that no interruption or holes exist even though one portion of my machine is continuously operated, whereas another portion is intermittent in action.

Again, my method contemplates a substantially automatic operation in the production of plastic products and of expansion joints particularly, and to this end I provide, in novel combination in my system, a mixing zone in which the asphalt and fibrous materials are mixed. The asphalt is fed into the mixing chamber from a heating container through an automatically-regulated valve which is so fed that the correct proportions of asphalt and fiber are automatically predetermined, that is, the valve automatically starts and cuts off to feed a predetermined amount of asphalt into the mixer. Such a valve forms no part of my invention and I will not, therefore, describe this device in detail. Likewise the fibrous material is automatically weighed out and dumped into the mixer when a predetermined amount has been deposited on a scale.

After the mixture has been properly and thoroughly incorporated, the same is dumped into a kneading or initial working zone where the material is pressed or kneaded, which is the initial step in my process. Thereafter a kneaded or worked portion is intermittently fed onto a conveyor and conveyed to forming rolls from which a continuous sheet is produced. The conveyor is so adjusted, as I will hereinafter more fully point out, that the intermittently fed material is supplied to the forming rolls in such manner that a continuous sheet issues from said rolls, irrespective of the intermittent feed from the said pressing member.

For a better understanding of my invention, reference may be had to the accompanying drawings, all of which it may be mentioned are more or less diagrammatically illustrative of my invention, although the machine illustrated is a practical commercial machine. In other words, those features which may be readily supplied by any skilled mechanic have been omitted in order that the process and machine may be clearly illustrated.

In the drawings:

Figure 1 is a side elevational view of a machine embodying my invention taken from the right-hand side thereof, assuming that the material moves forwardly from left to right of the sheet;

Figure 2 is a side elevational view of the presser and kneading mechanism of my invention, this figure being taken from the opposite side of the machine from Figure 1; that is to say, the material in Figure 2 is fed from the right to the left as is the case in all of the other figures of the drawings;

Figure 3 is an end, elevational, sectional view of the presser mechanism and taken on the line 3—3 of Figure 2;

Figure 4 is a side, elevational view of that portion of the machine immediately forward of the portion shown in Figure 2 and illustrates the compensating conveyor portion of the machine;

Figure 4A is an elevational cross-sectional view taken on the line 4a—4a of Figure 4;

Figure 5 is an elevational, sectional view of the forward end of the mechanism shown in Figure 4 but arranged vertically of the sheet so as to show the actuating means for raising and lowering said conveyor and also showing the said conveyor in its two extreme positions;

Figure 6 is a side elevational view of that portion of the machine immediately next forward of the portion shown in Figure 4;

Figure 7 is an elevational sectional view showing the extreme forward portion of the conveying system and particularly the cutting knives which are associated with said conveyor; and Figure 8 is a fragmentary, sectional view across the conveyor and expansion joint sheet showing the manner in which the knives and associated arbors are mounted.

Referring now generally to Figure 1, my invention comprises a mixing vessel 10 provided with an outlet valve 11 of any desired form. A predetermined amount of asphalt of each batch of mixture is fed through a pipe 12 provided with an automatically operated wheel 13, the latter functioning to feed the right amount of asphalt into the mixer and then cutting off. A shute 14 leads from the supply of fibrous material which is to be mixed with asphalt to form the raw material for the sheets of expansion joint. A closure member 15 is connected to an automatic tipping scale 16 so that when a predetermined amount of fiber has been fed onto the scale 16, the same will tip and throw the said material into the mixer and at the same time closing off the further supply through the chute 14.

I have only indicated the automatically operated means in general and wish it to be understood that any desired automatically proportioning means may be utilized to supply the fibrous material and asphalt to the mixing chamber.

When the mixture is properly incorporated, the valve 11 may be opened or, if the mixture is made in another portion of the plant, it may be transported by other means, and the mixture deposited on a belt 17 which runs over a roller 18 and is propelled at desired times by a roller 19, the latter being mounted on an axle 19a which is rigidly connected to the gear wheel 20 at one end (Fig. 1) and to the rack wheel 21 at the other end (Fig. 2). The belt 17 is supported in its upper flight by a floor 22 so that a mass of heavy material may be supported on said belt 17 and worked thereon. Said floor 22 and rolls 18 and 19 are supported on appropriate framing 23. Rising upwardly from said frame and positioned thereon so that the belt 17 moves through the bottom thereof, is a hopper 24 comprising side walls 25. As best seen in Fig. 3, these side walls are two-ply, leaving a hollow space therebetween for purposes to be hereinafter more fully described.

Pivotally mounted in order to work upwardly and downwardly in said hopper is a presser member 26 which is provided with an arcuately formed apron 27 and provided with depending side walls 28, which latter are adapted on the downward stroke of said presser member to cut away any material which may adhere to the side walls 25, and thereby insure that all of said material will be acted upon by the apron 27 of the presser. The entire presser member 24 swings about the pivot points 29 and is moved thereabout by crank-arms 30 secured to gear wheels 31, the latter being continuously moved in the direction of the arrow by operating means which will be more fully developed hereinafter.

Inasmuch as the plastic material which is worked upon in my machine is very adherent and sticky, I have found it desirable, if not essentially necessary, to provide heating means for the metal surfaces against which said plastic material contacts during passage through this machine. To this end I provide heating means within the pressing member 24 comprising a plurality of gas fed burners 32, the flames from these impinging on the inner surface of the apron 27 and heating the latter to a predetermined point. In the particular case here described—although my invention is not, of course, so limited—this apron is heated to about or slightly above the melting point of the asphalt of the mass so that the same does not adhere to the apron when the same is pressed against the mass.

As shown, these burners 32 are fed from pipes 33 and I further provide a blower 34 for producing the correct pressure and mixture of the gas so fed. A further passage 35 leads off from the main system and conducts gas to the pipes 36—36, which are best shown in Fig. 3. These pipes are positioned between the two plies of the side walls 25 so that these latter may also be heated to a correct temperature to prevent the mass from sticking to the side walls, and to permit the depending knife-like side walls 28 of the presser member to cut their way through the mass and free it from said side walls 25. Further, to prevent adherence of the mass to any portion of the pressing mechanism I provide the belt 17, as I do all other belts herein mentioned, with some sort of powder to prevent sticking.

The rods 30 are provided at either end—in this case I have illustrated the upper end—with adjusting means 37, so that the rise and fall of the presser member 27 may be adjusted. As best shown in Figs. 2 and 3 a plastic mass 38 is placed upon the belt 17 and is moved, by the forward movement of said belt, in the direction of the arrow, under the pressing apron 27. The belt 17 is then held stationary while the presser member 24 brings the apron 27 down onto the material and squeezes a defined portion of the mass into a certain thickness. The pressing member then rises and the belt 17 feeds the defined portion of the mass, which has been pressed into flattened and semi-formed condition, forward underneath the lower end of the apron 27 and out onto the plate 39. I will omit a description of the manner in which the various intermittent and continuous movements of my machine are produced and synchronized until after all of the working portions of the machine have been described.

Passing on, therefore, to Fig. 4 which is an illustration of that portion of the machine immediately next forward of the pressing means shown in Fig. 2, a belt conveyor 41 passes over rollers 42 and 43 at the ends of the belt and is guided in the manner shown by additional rollers 44 and 45, all of said rollers being journalled on a frame member 46 which is pivotally mounted at its lower right-hand end at 47. The material passing out from under the lower side of the pressing member, that is material 40, is intermittently fed over the plate 39 and onto belt or conveyor 41.

The belt 41 is intermittently moved in synchonized relation with the operation of the pressing member to progress a thick continuous ribbon 40 of the plastic material upwardly along the conveyor shown in Fig. 4. I will further explain the reason for this novel progression at a later point of the description. At the upper end of the belt 41 the material 40 is fed downwardly over two telescoping plates 48 and 49. Plate 49 is secured to a block 50 which in turn is pivotally supported by member 51, which latter member is provided at its lower end with a lug portion 52 rigidly secured to a frame portion 53 of the machine. This particular construction permits the stationary plate 49 to tilt and remain in close sliding contact with plate 48 during the telescoping of the latter plate thereover and the rise and fall of the conveyor 41. The plate 48 is provided with lug 54, said lug having a hole therein which moves along the guide rods 56.

When the conveyor 41 is moved upwardly during the rise of the same about its pivotal point, as I will hereinafter more fully describe, the plate 48 slides upwardly along plate 49 thereby increasing the distance which it is necessary that the thick ribbon 40 travel before it comes adjacent the forming rolls. As I will hereinafter more fully describe, such movement compensates for the intermittent feed, and during the downward movement of the conveyor the plates telescope or slide one over the other. While no material is being fed on conveyor 41 during the downward pivotal movement of said conveyor, the ribbon 40 is nevertheless continuously fed to the sheet forming rolls thereby producing a desirable continuous pressure of the sheet-like mass 40 towards the forming rolls.

Referring now to Fig. 6, the sheet forming mechanism proper comprises companion sets of twin rollers 57—58 and 59—60, these rollers being mounted on standard 61 and 62 respectively. The rollers proper are journalled in blocks 63 and 64 and 65 and 66, said blocks being adapted for sliding movement in the standards or guides 61 and 62 respectively, whereby the rollers may be moved apart or together to vary the thickness of the sheet which is formed by the rolls. The blocks 63—64 and 65—66 are urged apart by springs 67 and 68 respectively, and are adjusted through the medium of wheels 69 and 70.

A conveyor belt 71 carries the sheet between said forming rolls and after the formation thereof said sheet is supported on said belt in its further travel. The belt 71 is supported by and runs over the bottom rollers 58 and 60 and is further supported on a roller 72 mounted on the frame member 53. It will be observed that said roller is mounted in a block 73 which latter is adapted for adjustment by means of the threaded rod 74, as best seen in Fig. 4. In its forward limit of movement the belt or conveyor 71 passes over a roller 75 which is journalled in a block 76 mounted on the frame member 77.

After the formed sheet of material leaves the forward rolls 59 and 60, it passes off of the conveyor 71 onto a conveyor 78 which is power-driven by the sprockets 79 and 80 and the chain 81, it being understood that said conveyor 78 is quite lengthy but that I have shown it broken and shortened to conserve space.

The sprockets of gears 79 and 80 are mounted on blocks 82 and 83 respectively, which latter are bolted to a frame member 84. A supporting plate 85 may be likewise mounted on the frame 84 in order to support the finished sheet in its travel from the conveyor 71 to the conveyor 78.

At the forward end of the conveyor 78 are placed cutting means for dividing the sheet longitudinally into strips of definite width as part of my continuous process. These means are, I believe, of novel character, and contribute markedly to the success of the expansion joint manufacturing machine above described. They comprise a plurality of rotatable knives 86 which are mounted on a shaft 87 so that they may be adjusted therealong to provide for cutting strips of material of any desired width. These knives 86 are run at high speed by the shaft 87, the latter being driven by a pulley 88, which pulley is, in turn, driven by the belt 89. A plate 90 supports the sheet of material as it is being longitudinally cut, this plate serving as an accurate spacer for the knives 86.

Positioned above the sheet of material are a plurality of arbors 91 mounted on a shaft 92, which latter is driven by a gear wheel 93 and chain 94. Said arbors are shrouded as shown to receive the upper portion of the rotatable cutting knives 86 and are adjustable along the axle 92 commensurately with the knives 86. The shrouded portion presses against the sheet of material as it is progressed and cut by the knives. The rim speed of the arbors 91 is equal to the lineal speed of the progression of the joint. It is in this particular combining of high speed knives shrouded by an arbor operated at the lineal speed of the progression of the sheet being cut that my invention finds its marked advantages over previous cutting mechanisms.

This feature of my invention is of great advantage in present day expansion joint manufacture because the highway commissioners are now requiring that the edge of the joint be accurately and carefully cut square to produce a neat polished edge. In my experience, heretofore such a square cut polished edge has not been possible on a machine of this character.

After the sheet has been cut into strips, the latter are progressed onto a further conveyor 95, driven by a wheel 96 and chain 97.

While I have in the above description referred at various points to the driving means whereby my machine is operated, I will now revert to this driving mechanism as a whole and, referring particularly to Figure 1, point out the manner in which the various movements are synchronized with each other to produce continuously a smooth, full sheet of material at the forming rolls while initially pressing and feeding the raw material intermittently.

Referring more particularly to Figure 1, the chain driving system comprises a motor 98 which may be mounted overhead as shown on framing 99. The shaft of this motor is equipped with a double pulley as indicated. Belts 100 and 100' are driven by the pulleys on the motor 98 in the directions shown by the arrows. From belt 100 motion is transmitted through a variable speed connection, which I will not describe in detail, through belts 101 and 102 to large pulley 103, which in turn drives companion gears 104 and 105 to progress the belt or conveyor 71 forwardly of the machine. Belt 100' drives pulley 106 (another variable speed connection), belt 107, pulley 108, belt 109, and pulley 110 to transmit the energy of the motor to a gear wheel 111 and the main drive chain 112, said chain 112 being, of course, a constantly running chain.

Referring now more particularly to Figure 2, which is a view taken from the opposite side of the machine from that of Figure 1, it will be seen that chain 112 drives gear wheel 113, inner wheel 114 drives gear 115 whose inner gear 116 in turn drives the presser gear 31 in the direction indicated by the arrow. As before explained, the gear 31 drives the connecting rod 30 in such manner as to move the presser 24 in its predetermined movements.

Moreover, as I have before pointed out, the conveyor belt 17 moves the mass of raw material 38 intermittently, such forward movement of the conveyor 17 and mass 38 being made during the time that the presser 24 is rising, and said belt 17 and mass 38 remaining stationary when said presser is descending and pressing or kneading the mass.

This intermittent movement of the belt 17 is accomplished in the following manner. A roller pin 117 is positioned near the periphery of the gear wheel 31 and is adapted to contact with one arm 118 of a bell crank 119, which latter is pivoted at 120 on the cross-beam 23a of the frame 23. As the pin 117 moves around and under the arm 118 the bell crank 119 is rocked so that the lower end of the arm 121 of said bell crank is moved rearwardly to pull the member 122 in the same direction (toward the right of the sheet). Mounted on said member 122 is a pawl 123 which is pivoted on a member 124 to engage the teeth of wheel 125 during the rearward movement of member 122. A stop pawl 126 prevents the backward movement of the wheel 125.

It will be observed that the wheel 125, when turned in the direction of the arrow, rotates a roller 127 upon which the belt 17 is supported. Therefore, when the pin 117 comes under the arm 118 and, through the members just described, rotates the wheel 125, the belt 17 is moved forwardly until the pin 117 rolls off from under the arm 118. In this manner the continuous motion of the chain 112 is translated into intermittent motion of the mass-supporting conveyor 17. Extending further forwardly from the member 122 is a rod 128 pivotally connected at its forward end to arm 129, as best shown in Figure 4, of another bell crank 130 pivoted at 131. The other arm 132 of said crank 130 is connected to a supporting rod 133, the upper end of which is pivotally mounted at 134 to support and control the lifting movements of the frame 46. Through the connection just described, the lift of the frame 46 and the accompanying forward movement of the associated conveyor 41 are controlled in accordance with the movement of the teeth of wheel 125 which the pawl 123 "takes" in any one rearward movement of the rod 122.

Referring now more particularly to Figures 1 and 5 (it being noted that these views are taken from opposite sides of the machine and that reference to both must be had in order to understand clearly the operating means), I will explain the manner in which the conveyor 41 is raised and lowered at predetermined times and is progressed forwardly during the period it is rising. The driving means for the conveyor 41 is furnished by the gear 20 which is intermittently moved by reason of its connection to the rack wheel 21 through the axle 19a.

Gears 135 are mounted at both ends of the roller 43 over which the conveyor 41 passes at its upper end. Said gears 135 are connected to chains 136, which chains are in turn driven by small gear wheels 137, the latter being fixed to the same shaft as a large wheel 138. Said wheel 138 is driven in the direction shown by the arrow (see Fig. 1) by chain 139 driven from sprocket 140, which latter is on the same shaft as gear 116. The chain 136 passes over guide sprockets 141 and 142. This mechanism is fully shown in Figure 1, but may be better understood by referring to Figure 5 where it is illustrated in enlarged form.

A chain 135a connects gear wheel 42a with gear wheel 135b, which latter is mounted on the same shaft as wheel 135. When said gear 42a is intermittently moved, by reason of its connection through chain 20a and gear 20, the chain 135a and wheel 135b are also moved to progress the conveyor belt 41.

The gears 141 and 142 are journalled on an arm 143 which is pivotally mounted at 144 on a frame 145, which latter also supports the block in which the gear 137 is journalled. Said arm 143 is provided with an arcuate member 146, so that as said arm swings upwardly and downwardly (see Fig. 5) a cord 147 contacts therewith through a substantial portion of the arc. Said cord 147 passes over a pulley 148, which latter is secured to a block 149 fastened to a portion of the frame 99. A weight 150 is fastened to the lower end of the cord 147.

In Figure 5 I have shown the lower position of the frame 46 and the conveyor 41 supported thereby in dotted lines, and all the driving and supporting means for said conveyor in the lower position being likewise shown in dotted form. The full line showing represents the various elements and the conveyor after the latter has been raised during the feed of the defined portions of the kneaded mass of raw material onto the conveyor 41.

Referring now to Figure 5, it will be seen that, as the conveyor raises the wheel 135, it climbs up, as it were, the chain 136, and because of this, said chain becomes slack. As this slack occurs, the weight 150 rotates the arm 143 upwardly and thereby takes up the slack, as shown in the full line position of the members in Figure 5. When on the other hand, the conveyor is lowered the slack pays out and permits the wheel 135 to remain stationary and not rotate.

As before indicated, the intermittent movement of the belt 41 to progress the material forwardly occurs during the upward movement of the pressing member. This movement of belt 41 is arranged to occur as the conveyor 46 and 41 is raised for reasons hereinafter described. During this movement of the belt 41 the wheels 135 climb their chains.

Because of the novel and particular combination of elements just described, I am able to intermittently progress the conveyor 41 in the direction of the arrows and at the same time intermittently raise and lower the same, thereby obtaining a most desirable synchronizing of the movements of my machine.

Having described the various elements comprising my machine, the method of producing an expansion joint therewith is as follows: The automatic opening-and-closing valve 13 admits a fixed amount of asphalt into mixer 10 and concurrently therewith, the automatic scale 16 dumps a predetermined amount of fibrous material into said mixer. After the materials have been thoroughly mixed they are disposed on the belt or conveyor 17, as best shown in Figures 2 and 3.

The mass 38 thus disposed on the belt 17 is intermittently moved forward through the interaction of the continuously driven chain 112, the pin 117 and the pawl driven wheel 125. When belt 17 is stopped by the passing of the roller 117 out from under the arm 118, the presser member moves downwardly under the influence of connecting rods 30, whereupon the apron 27, which has been heated to a predetermined degree, irons out or kneads the mass 38 into desirable form, and in fact defines a portion thereof, the depending knife-like sides 28 during this downward movement cutting the mass away from the side walls 25 of the hopper and thereby preventing the sticking thereof.

As the presser member rises, the conveyor 17 moves the mass forwardly again, and passes a portion thereof between the conveyor and the lower right-hand end of the presser member. The portion thus pushed out, or we may say defined, is pushed forwardly onto the pivotally mounted conveyor member 41. The said conveyor 41 intermittently moves the mass of material forwardly toward the top of the pivoted frame 46 at the times and for the reasons hereinbefore described and allows it to flow downwardly over the telescoping plates 48 and 49 into proximity to the opening between the sheet forming rollers 57 and 58 (see Fig. 6). During this feeding movement from under the presser member, the heretofore described cooperation between the intermittently operated gear 21 and its associated mechanism lifts the conveyor 41 about its point of pivotal connection 49. During this period of lifting, the belt 41 moves forwardly under the influence of said mechanism to take care properly of the material being fed thereunto.

When, however, the presser is kneading the material or working out a defined portion thereof and the hopper conveyor 17 is stationary, no material is fed onto the conveyor 41. In order, therefore, to maintain an unbroken flow of material to the rear of the sheet forming rolls 57 and 58 and insure continuous pressure of said material to said rolls, conveyor 41 as a whole pivots downwardly about the point 47 so that, although no material is fed thereonto, the thick ribbon 40 in the upper end continues to be fed toward the said forming rolls due to the lowering movement of the conveyor 41, and, although there is no movement of the gear wheel 135, the slack in the chain is taken care of as heretofore described. In this manner a continuous thick ribbon, which is of unbroken character and of sufficient density to provide the required material for the sheet to be formed, is forced between the forming rolls 57 and 58. It will be noted that the upper forming rolls carry a belt 71a, which assists in forming the sheet as required, and that in reality, therefore, the finished sheet of material having a thickness as indicated at 71b is formed between the belts 71 and 71a. After passing between the rolls 59 and 60, the sheet progresses onwardly to the cutting mechanism, where, as I will hereinafter explain, the formed sheet is cut into strips of any desired width by the high-speed, cleanly-cutting knives 86.

From the above it will be apparent that my method contemplates working on a most refractory and work-resistant plastic material composed as it is of asphalt and intermixed with fibrous material. As heretofore explained, it is necessary to so act upon this raw material that it may be intermittently pressed or kneaded and at the same time so fed to forming means that a continuously flowing sheet will be obtained. My method, therefore, contemplates the steps above indicated.

Furthermore, it will be noted that the production of expansion joints in accordance with my novel method is substantially automatic from the mixing of predetermined, automatically-controlled quantities of material to the cutting means and that, therefore, the attendance necessary to insure proper functioning of a machine capable of carrying out my process is reduced to a minimum.

While, therefore, I have described an efficient and commercially usable machine for practicing my novel method heretofore disclosed, it is to be understood that other machines may be found capable of practicing the same method and I do not intend to limit myself to the illustrative description given, nor do I intend to limit the method as being capable of use in connection with plastic material made into expansion joints only. The same problems may arise with other materials which possess like shortcomings so far as workableness is concerned as that which I have heretofore described.

Again, I have described as indicated, a commercially successful machine, but in many points the showing of this machine is illustrative and many changes may be made therein, whereby the idea of means will be the same, without departing from my invention. This is particularly true with respect to the various driving elements and means for synchronizing the movements of the various parts of the machine, hence many may adopt widely dissimilar and yet equivalent means to obtain the same general and novel arrangement. I desire, therefore, that my invention be limited only by the scope of the appended claims and the showing of the prior art.

I claim:

1. The method of continuously working a mass of plastic adherent material into a flat sheet which comprises intermittently kneading said mass and then feeding the same to forming rolls in such sequence as to produce a continuously flowing sheet from said rolls.

2. The method of continuously working a mass of plastic adherent material into a flat sheet which comprises kneading said mass, defining a portion thereof, and then feeding said defined portion to a forming mechanism so as to produce a continuously flowing sheet from said mechanism.

3. The method of continuously working a mass of plastic adherent material into a flat sheet which comprises intermittently kneading said mass, defining a portion of said mass after each kneading thereof, and thereupon feeding said defined portions to forming rolls in such sequence as to produce a continuously flowing sheet from said rolls.

4. The method of continuously working a mass of plastic adherent material into a flat sheet which comprises intermittently kneading said mass, defining a portion of said mass after each kneading thereof, and thereupon feeding said defined portion to forming rolls in such sequence as to produce a continuously flowing sheet from said rolls.

5. The method of continuously making a mass of plastic adherent material into a flat sheet which comprises intermittently kneading said mass, defining portions of said kneaded mass, feeding said defined portions to forming rolls during the non-kneading periods, and varying the effective length of feed from the kneading point to the forming rolls to transform said intermittently fed portions into a continuously flowing sheet to the rolls.

6. In a machine for transforming a plastic adherent mass into a sheet of said plastic material, a kneading device wherein said mass is kneaded, means for defining portions of said mass after kneading and means for converting said defined portions into a continuous sheet.

7. In a machine for transforming a plastic adherent mass into a sheet of plastic material, a kneading device wherein said mass is kneaded, continuously operating sheet-forming rolls, and means for intermittently defined portions of said kneaded mass and feeding them to said rolls to produce a continuous sheet of material.

8. In a machine for trannsforming a plastic adherent mass into a sheet of said plastic material, a kneading member adapted to intermittently press said mass to prepare it for further working, a feeding member adapted to periodically define portions of the kneaded mass, sheet forming means, and conveyor means to transfer said defined portions to said forming means.

9. In a machine for transforming a plastic adherent mass into a sheet of said plastic material, a kneading member adapted to intermittently press said mass to prepare it for further working, a feeding member adapted to periodically feed defined portions of the kneaded mass, sheet forming means, conveyor means to transfer said intermittently defined portions to said forming means, and means for adjusting said conveyor to compensate for the intermittent placement of said portions on said conveyor and produce a smooth continuously flowing sheet at said forming means.

10. In a machine for transforming a plastic adherent mass into a sheet of said plastic material, a kneading member adapted to intermittently press said mass to prepare it for further working, a feeding member adapted to periodically define portions of the kneaded mass, sheet forming means, conveyor means to transfer said intermittently defined portions to said forming means and means for adjusting said conveyor to compensate for the intermittent placement of said portions on said conveyor and produce a smooth continuously flowing sheet at said forming means, said last means comprising a device for lifting said conveyor as the intermittently defined portions are fed thereunto.

11. In a machine for transforming a plastic adherent mass into a sheet of said plastic material, kneading means for said mass comprising a feeding belt on which said mass is initially positioned, a pressing member, and means synchronizing the belt and pressing member to cause said belt to feed said mass forward, said member then pressing downwardly to knead said mass, and said belt finally again feeding said mass forward under said pressing member.

12. In a machine for transforming a plastic adherent mass into a sheet of said plastic material, kneading means for said mass comprising a feeding belt on which said mass is initially positioned, a pressing member, heating means associated with said presser to melt said plastic and prevent the same from sticking, and means synchronizing the belt and pressing member to cause said belt to feed said mass forward, said member then pressing downwardly to knead said mass, and said belt finally again feeding said mass forward under said pressing member.

13. In a machine for transforming a plastic adherent mass into a sheet of said plastic material, kneading means for said mass comprising a feeding belt on which said mass is initially positioned, a pressing member and means synchronizing the belt and pressing member to cause said belt to feed said mass forward, said member then pressing downwardly to knead said mass, and said belt finally again feeding said mass forward under said pressing member, said member during its pressing movement flattening and defining a portion of said mass against said belt, and said belt in its forward movement feeding said portion forwardly from under said presser at the same time an unpressed portion of said mass is moved in under said presser.

14. In a machine for transforming a plastic adherent mass into a sheet of said plastic material, kneading means for said mass comprising a feeding belt on which said mass is initially positioned, a pressing member, and means synchronizing the belt and pressing member to cause said belt to feed said mass forward, said member then pressing downwardly to knead said mass, and said belt finally again feeding said mass forward under said pressing member, said belt remaining stationary during the presser movements of said member and moving forwardly while said presser is rising for its next kneading stroke.

15. In a machine for transforming a plastic adherent mass into a sheet of said plastic material, kneading means for said mass comprising a feeding belt on which said mass is initially positioned, a pressing member, and means synchronizing the belt and pressing member to cause said belt to feed said mass forward, said member then pressing downwardly to knead said mass, and said belt finally again feeding said mass forward under said pressing member, forming rolls, a conveyor adapted to receive the portions fed from under said presser, means for moving said conveyor forwardly during the non-pressing movements of said presser member and for raising said conveyor to compensate for the variation between intermediate feeding of material thereunto and continuous withdrawal of said material therefrom.

In witness whereof, I have hereunto subscribed my name.

ARTHUR E. BROWN.

CERTIFICATE OF CORRECTION.

Patent No. 1,826,985.  Granted October 13, 1931, to

ARTHUR E. BROWN.

It is hereby certified that error appears in the printed specification of the above numbered patent requiring correction as follows: Page 6, line 101, for the misspelled word "predtermined" read predetermined; page 7, line 59, claim 7, for "defined" read defining; and that the said Letters Patent should be read with these corrections therein that the same may conform to the record of the case in the Patent Office.

Signed and sealed this 15th day of December, A. D. 1931.

(Seal)

M. J. Moore,
Acting Commissioner of Patents.